United States Patent Office 3,288,723
Patented Nov. 29, 1966

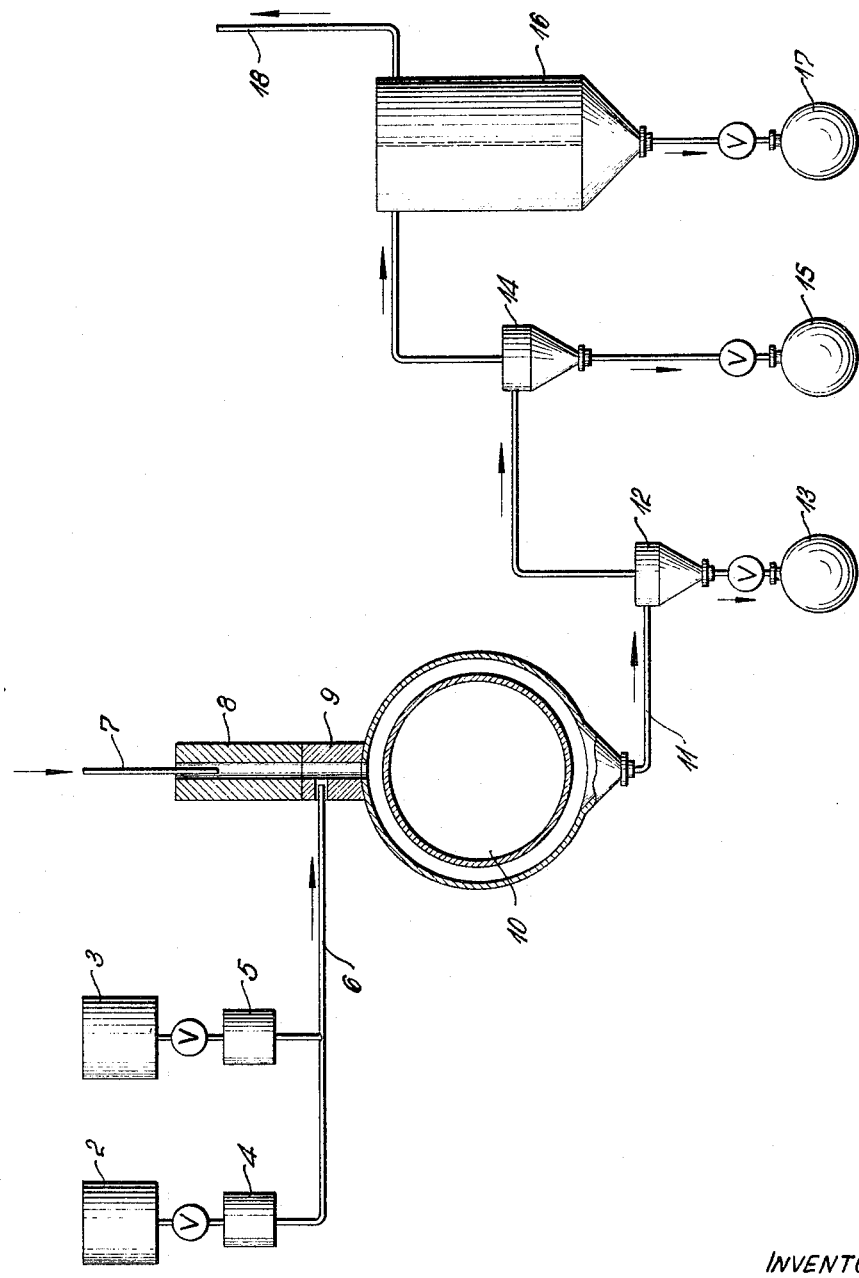

3,288,723
PROCESS FOR THE MANUFACTURE OF TITANIUM TRICHLORIDE AND ALUMINUM CHLORIDE MIXED CRYSTALS
Gero Heymer, Knapsack, near Cologne, Albert Gumboldt, Frankfurt am Main Hochst, and Heinz Harnisch, Lovenich, near Cologne, Germany, assignors to Knapsack-Griesheim Aktiengesellschaft, Knapsack, near Cologne, Germany, a corporation of Germany
Filed June 26, 1963, Ser. No. 290,723
Claims priority, application Germany, Aug. 3, 1962, K 47,424
8 Claims. (Cl. 252—442)

The present invention relates to a process for the manufacture of titanium trichloride/aluminum chloride mixed crystals, which are especially suitable for use, for example, as catalysts for the polymerization of olefins.

It is known that catalysts containing titanium trichloride and aluminum chloride as their substantial constituents can be used for polymerizing α-olefins under low pressure.

These catalyst systems can be prepared by reducing titanium tetrachloride with aluminum in powder form according to the equation:

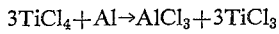

$$3TiCl_4 + Al \rightarrow AlCl_3 + 3TiCl_3$$

This reaction can be carried out at 250° C. or, with the aid of a ball mill and an organic solvent, at room temperature.

Apart from the fact that this process is carried out in discontinuous manner, it does not enable completely uniform products and true mixed crystals to be obtained. When these mixtures which are prepared at elevated temperatures, are intended to be used as polymerization catalysts, they must previously be comminuted in a ball mill to incorporate therewith sufficient catalytic activity. These elevated temperatures furthermore complicate the formation of well crystallized mixed crystals.

The present invention now provides a process for the manufacture of true titanium trichloride/aluminum chloride mixed crystals, wherein a mixture of gaseous titanium trichloride and gaseous aluminum chloride, which may also contain a carrier gas, is chilled with the resultant formation of titanium trichloride/aluminum chloride mixed crystals in fine powder form. In view of the fact that the sublimation temperatures of aluminum chloride and titanium trichloride differ substantially from one another and that titanium trichloride has the tendency at high temperatures to disproportionation into titanium tetrachloride and low titanium halides, it is necessary to effect the chilling step immediately after the formation of the titanium trichloride in the gaseous phase.

The process of the present invention offers a series of advantages as opposed to the conventional methods, which include:

(1) The formation of true mixed crystals with the proviso that gaseous aluminum chloride and gaseous titanium trichloride are thoroughly mixed before the resulting mixture is chilled.

(2) The composition of the resulting mixed crystals can be pre-determined by using corresponding proportions of the two chlorides.

(3) Both the crystallinity and the particle size are a function of the chilling conditions and can therefore be adapted to requirements.

(4) The process can obviously be carried out in continuous manner by taking care that the resulting powder is separated from the carrier gas by appropriate means, such as a cyclone, a settling vessel, etc.

(5) The preparation of titanium trichloride is merely associated with the formation of by-products which are still in the gaseous state at the necessary chilling temperature, so that the resulting product need not be subjected to any after-treatment step.

(6) The mixed crystals obtained are especially suitable as a basic catalytic substance for use in olefin-polymerization processes.

In a preferred mode of executing the process of the present invention, gaseous titanium tetrachloride is reduced in a manner known per se with hydrogen with the resultant formation of titanium trichloride, the titanium trichloride is immediately mixed with hot aluminum chloride gas and the resulting mixture is chilled. Alternatively, the aluminum chloride gas may advantageously be admixed with the titanium tetrachloride before the latter is being reduced so as to ensure that the two components are completely mixed with one another and so as to enable more rapid chilling. The reduction can be carried out in an especially advantageous manner by first heating the hydrogen in an electric arc to very high temperatures (more than 2000° C.) and then reacting it with the mixture of gaseous titanium tetrachloride and gaseous aluminum chloride in a cooled mixing zone. The walls of the mixing zone being cooled and the necessary heat being transferred to the reaction mixture by the hydrogen rather than indirectly, there are no corrosion problems, that is to say contamination of the resulting catalyst by the walls of the reaction zone. The reaction proceeds very rapidly (within a fraction of a second) so that the rapidly following chilling step cannot result in the titanium trichloride being disproportionated. The high temperature used offers the further advantage that the aluminum chloride ($Al_2Cl_6$) which appears in dimeric form at low temperatures, can here readily be incorporated as monomeric $AlCl_3$ into the titanium trichloride lattice.

An apparatus suitable for use in carrying out the process of the present invention is shown diagrammatically in the form of a flow scheme in the accompanying drawing, in which the numerals designate the following parts: 2 is a reservoir for $AlCl_3$; 3 is a reservoir for $TiCl_4$; 4 is an evaporator for $AlCl_3$ and 5 an evaporator for $TiCl_4$. The two evaporators communicate through common line 6 with a coolable mixing nozzle 9 disposed at a position below heating means 8 which serves to heat the hydrogen supplied through line 7, the heating means being, for example, an electric arc. A chilling means 10 is disposed at a position below mixing nozzle 9, the chilling means communicating through line 11 with cyclones 12 and 14 and with settling vessel 16 provided with an off-gas line 18, and with collecting vessels 13, 15 and 17 disposed therebeneath.

The flow scheme in the accompanying drawing exemplifies a preferred mode of executing the process of the present invention which clearly is not limited thereto.

The process of the present invention is carried out, for example, as follows:

Titanium tetrachloride and aluminum chloride in the molar ratio of 5:1 to 2:1, preferably 3:1, are transformed separately in evaporator 4 respectively 5 adapted to the specific character of the particular substance, and mixed. The resulting gas mixture is supplied to mixing means 9, combined therein with hydrogen, which is first passed at a great velocity (more than 200 meters per second) through a zone 8 heated to a high temperature (more than 2000° C.), for example an arc burner equipped with water-cooled metal electrodes, and then introduced from above into the mixing means 9 cooled to a temperature of 20 to 300° C. The mixing means may be shaped, for example, as a channel of circular cross-sectional area through which the hot hydrogen flows from above to below, while the gaseous mixture of titanium tetrachloride and aluminum chloride is introduced into the mixing means and the said hot hydrogen by being forced through an annular slit disposed at the periphery of the channel. In the mixing means, the reaction takes the course shown by the following equations:

$$2TiCl_4 + H_2 \rightarrow 2TiCl_3 + 2HCl$$

or $$TiCl_4 + H \rightarrow TiC_3 + HCl$$

The $TiCl_3/AlCl_3$-mixed crystals are then separated in the form of a very fine powder on a chilling means 10, for example a rotating, water-cooled roller of stainless steel, and cooled before the $TiCl_3$ formed can undergo further disproportionation. The fine powder can ultimately be separated from the remaining gas consisting of hydrogen, hydrogen chloride and possible unreacted titanium tetrachloride with the help of cyclones 12 and 14 and settling vessels 16, and collected in containers 13, 15 and 17.

It has already been mentioned above that it is known to use $TiCl_3/AlCl$-mixtures as a basic catalytic substance in polymerization processes.

Belgian Patents Nos. 533,362, 534,792, and 534,888 describe processes for polymerizing lower olefins under low pressure and at low temperatures. The catalysts employed in the processes are mixtures of compounds of the elements belonging to subgroups 4 to 6 of the Mendelejeff Periodic Table with metals belonging to groups 1 to 3 of that Periodic Table or their compounds, such as hydrides or alkyls. These mixed catalysts are widely used in industry and are termed "Ziegler-type catalysts." The mixing of the catalyst components, for example $TiCl_4$ with aluminum alkyls or aluminum halogeno-alkyls is often associated with a reduction of the subgroup element compounds to a lower stage of valency.

These catalysts were the first to enable also those α-olefins of the homologous series of the $\Delta^1$-olefins to be transformed into high molecular weight solid thermoplastic polymers, which by the customary methods of radical-chain polymerization under high pressures, or of cation or anion-initiated polymerizations under pressure or at low temperatures could not be transformed at all or could only be transformed into relatively low molecular weight liquid or semi-solid polymers.

A typical representative of the above α-olefin is propylene which could only be polymerized into solid thermoplastic polypropylene of high molecular weight when the catalyst systems described in the above Belgian patents had been discovered.

During the polymerization of olefins of the type $CH_2 = CHR$ with the above catalyst systems polymer modifications have been obtained which differ substantially from one another in their physical properties, such as melting temperature, crystallinity, solubility in organic solvents, strength, elongation, etc.

G. Natta, J. Polymer Sci., 16, 143 (1955), attributed the formation of these polymer modifications which distinguish distinctly from one another in their properties to the appearance of different steric configurations, and introduced the term "tactic" polymers into the nomenclature, defining as "isotactic" the stereo-regular configuration of asymmetrical C-atoms in the polymer chain as the d- and l-modifications, as "syndiotactic" the alternating d- and l-modifications, and as "atactic" those modifications which fail to display any regularity in the distribution of the tertiary C-atoms of identical steric configuration.

Of these modifications, those have met with particular interest in industry which in their steric configuration fairly approach Natta's theroretical models, the isotactic of syndiotactic modifications or their mixtures. These modifications or their mixtures have high melting points, a high crystallinity and rigidity and are substantially insoluble in organic solvents.

Catalysts which are prepared by reacting compounds of elements of subgroups 4 to 6 of the Mendelejeff Periodic Table with organometal compounds of elements of groups and subgroups 1 to 3 of the Mendelejeff Periodic Table produce either of these two modifications, both the stereo-regular, crystalline polymers and the stereo-irregular, amorphous and soluble polymers from the monomers of the general formula $CH_2 = CHR$.

The reaction, for example, of titanium tetrachloride in conventional manner with aluminum alkyls in an inert organic solvent, such as hexane or heptane, followed by the introduction of propylene into the dispersion of the dark-colored, precipitated catalyst containing the titanium in a lower stage of valency, results in the formation of polymers containing a great proportion of the less useful, amorphous, soluble and stereo-irregular modification.

The literature and pertinent patent literature describe a plurality of experiments which all aim at increasing the proportion of stereo-regular crystalline polymer by modifying the catalyst system. Thus, attempts have been made to reduce titanium tetrachloride at high temperatures with hydrogen to titanium trichloride and to use the resulting violet α-titanium trichloride after activation with aluminum alkyls as the basic catalytic substance, for example, for the polymerization of propylene or α-butene. It was found that the catalyst had a relatively great stereo-specificity —~80 to 90% of stereo-regular polymer were obtained—but the catalyst activity was small.

It is also known that catalyst systems which contain mixtures of the violet α-titanium trichloride with aluminum chloride, may have a good activity associated with a good stereo-specificity.

It has now unexpectedly been found that the mixed crystals prepared by the process of the present invention are especially suitable for use as catalyst components in the polymerization of α-olefins. These mixed crystals enable catalyst systems of very good stereo-specificity and good activity to be prepared. The catalysts can be introduced in measured quantities while dry or in the form of a dispersion in the organic dispersant or solvent, in which the polymerization is carried out, into the polymeriaztion vessel. The dispersants and solvents used include, for example: butane, pentane, hexane, heptane, octane; petroleum fractions carefully freed from sulfur, oxygen and olefins; aromatic substances, such as benzene, toluene, xylene; cycloaliphatic substances, such as cyclohexane, methylcyclohexane; halogenated hydrocarbons, such as carbon tetrachloride, methylene chloride, chlorotrifluoroethane and bromotrifluoroethane, etc. Alternatively, the polymerization may be carried out in the liquid monomers themselves. The polymerization itself can be carried out continuously or discontinuously.

The following monomers, for example, can be polymerized with the above-mentioned catalysts: ethylene and its straight chain $\Delta^1$-homologs, such as propylene, butene-(1), pentene-(1), hexene-(1); α-olefins having aliphatic branches, such as 3-methyl-butene-(1), 4-methylpentene (1), 4-ethylpentene-(1); 5-methylhexene-(1); aromatically substituted α-olefins, such as styrene, allylbenzene, 4-phenyl-butene, etc. Dienes, for example, 1,3-butadiene, isoprene, 1,5-hexadiene, dicyclopentadiene, etc. may also be polymerized. Still further, the catalysts of the present invention can be used for making copolymers of the above-mentioned monomers.

The polymer reaction can be activated by means of compounds which contain at least one metal-carbon linkage, for example: alkali alkyls and aryls, e.g. lithium butyl, lithium phenyl; alkaline earth metal alkyls, e.g. beryllium diethyl, magnesium diethyl, magnesium ethylchloride; aryl and alkyl compounds of the earth metals, such as boron triethyl, aluminum triethyl, aluminum ethylsesquichloride, aluminum diethylmonochloride, aluminum ethyldichloride, aluminum triphenyl, as well as their hydrides and hydride complexes with alkali metals. There may also be used as the activator compounds of the elements belonging to group 4 of the Mendelejeff Periodic Table, such as silanes, alkyl silanes, alkyl siloxanes, germanium alkyls, tin alkyls and lead alkyls.

The ratio of the activators to the catalysts of the present invention may vary within the wide limits of 0.5:1 to 20:1, but it is advantageous to use a ratio of Ti$^{3+}$ to activator of 1:1 to 1:2.

The temperature at which the polymerization is carried out may vary within the range of −10 to +180° C. and should preferably be situated at +30 to 90° C., while the pressures applied may vary from a slight reduced pressure of 0.5 atmosphere absolute to up to 100 atmospheres, preferably from 0.5 to 5 atmospheres (gauge pressure).

The following examples serve to illustrate the invention, but they are not intended to limit it thereto:

*Example 1.—Preparation of the mixed crystals*

4.72 kg./hr. titanium tetrachloride were evaporated at 190° C. and 0.904 kg./hr. aluminum chloride was evaporated at 220° C. (with the application of pressure). The resulting vapors were mixed and introduced into a mixing device in which they were reacted with 3.4 cubic meters hydrogen (measured at N.T.P.) heated to about 2000° C. The titanium tetrachloride was thereby reduced to titanium trichloride. Immediately after the reduction, the gas mixture was chilled on a cooled roller of stainless steel and a fine powder of titanium trichloride/aluminum chloride mixed crystals was obtained, which could be removed from the gas current by means of a cyclone and a baffle separator. 0.72 kg. unreacted titanium tetrachloride could be removed by cooling to low temperatures. 85% of the titanium tetrachloride were thus transformed into titanium trichloride. 4.15 kg. titanium trichloride/aluminum chloride mixed crystals were obtained, wherein the atomic ratio of Ti:Al was 1:0.322. The X-ray powder diagram indicated merely the lines of TiCl$_3$.

*Example 2.—Preparation of the mixed crystals*

4.1 kg. titanium tetrachloride and 0.86 kg. aluminum chloride were evaporated within 1 hour, then mixed and supplied to a mixing device, wherein the material was reacted with 4.5 cubic meters hydrogen (measured at N.T.P.) heated in an electric arc (150 amperes, 145 volts) to a temperature of about 3500° C. During the immediately following chilling of the gas mixture by being contacted with a cooled surface, the titanium trichloride obtained formed together with the unchanged aluminum chloride a very finely divided and well crystallized powder of mixed crystals having an atomic ratio of Ti:Al of 1:0.33. After the powder had been removed from the gas current, 0.41 kg. titanium tetrachloride could be separated therefrom. 90% of the titanium tetrachloride were thus transformed into titanium trichloride. Altogether 3.86 kg. titanium trichloride/aluminum chloride mixed crystals were obtained, of which the X-ray powder diagram merely indicated the lines of titanium trichloride.

*Example 3.—Application of the mixed crystals*

A 500 liter polymeriaztion vessel provided with a stirrer and a heating respectively a cooling jacket was first charged with 300 liters of a petroleum fraction boiling between 150 to 180° C. which had been refined and hydrogenated and thereby carefully freed from sulfur, oxygen and olefins, then heated at 50° C., scavenged with nitrogen carefully freed from oxygen and moisture and 3 mols (10 millimols per liter measured as Ti$^{3+}$) of the TiCl$_3$/AlCl$_3$ mixed crystals prepared in the manner described in Example 1 were ultimately introduced into the vessel after the remaining air had been expelled, the mixed crystals being introduced with the exclusion of atmospheric oxygen. Stirring was started and a 20% aluminum diethylmonochloride solution, altogether 6 mols Al(C$_2$H$_5$)$_2$Cl, was slowly run into the catalyst dispersion. Very pure propylene was then introduced in quantities measured by means of a gasometer and rotameter, in the interim, a brine of +15° C. was supplied through the cooling jacket to the polymerization vessel. After 6 hours of polymerization, a thick, dark-brown polymer magma had formed in the vessel. The polymerization was arrested by adding 6 liters n-butanol, the whole was allowed to react for 30 minutes at 50° C. and the material in the vessel was washed three times at 50° C., each time with 100 liters desalted water (decantation). The contents of the vessel were placed on to a suction filter, the bulk of the dispersant was removed by suction filtration and the remainder thereof was expelled by means of steam. After drying for 24 hours in a circulating air drying cabinet there were obtained 60 kg. of colorless polypropylene having a viscosity number $\eta_{sp/c}$ of 8.8 measured as a 0.1% solution of the polymer in decahydronaphthalene). 2.5 kg. of amorphous, rubber-like polypropylene were obtained from the mother liquor by distillation.

*Example 4.—Application of the mixed crystals*

The vessel described in Example 3 was first charged under very pure nitrogen with 300 liters n-heptane, then with 1.5 mols (calculated on Ti$^{3+}$) of the TiCl$_3$/AlCl$_3$ mixed crystals prepared in the manner set forth in Example 1, and 1.5 mols aluminum ethylsesquichloride in a 20% n-heptane solution were added. Stirring was started and 120 kg. of a mixture of equal parts (50%) 4-methylpentene-(1) and (50%) 4-methylpentene-(2) were added dropwise within 6 hours at 50° C. The whole was allowed to react for a further 6 hours, 8 kg. n-butanol were added and the batch was allowed to react for a further 60 minutes while being stirred at the indicated temperature. The material in the vessel was decanted three times, each time with 100 liters water at 50° C., then placed on to a suction filter and colorless poly-4-methylpentene-(1) was removed by suction-filtration. Still adhering rests of n-heptane were expelled by means of a current of steam. After drying, 58.2 kg. pure polymer melting at 225° C. and having an $\eta_{sp/c}$-value of 10.4 were obtained. 4-methylpentene-(2) was removed from the mother liquor by distillation, while 1.8 kg. wax-like poly-4-methylpentene-(1) remained in the distillation residue.

*Example 5.—Application of the mixed crystals*

A 4-liter four-necked flask was charged with 20 millimols (Ti$^{3+}$) of the TiCl$_3$/AlCl$_3$ mixed crystals (prepared in the manner described in Example 1) in 2 liters n-heptane which had been scavenged with very pure nitrogen, 40 millimols aluminum diethylmonochloride were added, and very pure propylene was then introduced while stirring and heating at 50° C. At the same time a solution of 35 grams allylbenzene in 100 grams n-heptane was added dropwise within 6 hours. The polymerization was arrested by adding 10 cc. n-butanol, the whole was stirred for 30 minutes at 50° C., washed three times with 500 cc. water at 50° C., copolymer in the form of a colorless powder was removed by suction-filtration, the residual solvent was steam distilled, and the copolymer was dried. 230 grams copolymer having an $\eta_{sp/c}$-value of 8.2 (measured as a 0.1% solution of the copolymer in decahydronapthalene) were obtained. The ultrared spectrum indicated 4% allylbenzene units in the polymer. The mother liquor was evaporated and 9 grams of a rubber-like residue were obtained.

*Example 6.—Application of the mixed crystals*

A 250 cc. flask was charged with 2 millimols (Ti$^{3+}$) of the TiCl$_3$/AlCl$_3$ mixed crystals (prepared in the manner described in Example 2) in 100 cc. n-heptane after the atmospheric oxygen in the flask had previously been expelled with nitrogen. 2 millimols aluminum triethyl were added, the whole was heated at 80° C., while stirring, and 9.2 grams styrene dissolved in 50 cc. n-heptane was added dropwise within 3 hours. The catalyst was then destroyed by adding 3 cc. n-butanol and the material was washed three times with water at 80° C. The solvent was removed by suction filtration and residual solvent adhering to the polystyrene was expelled by steam distillation. After drying, 6.5 grams polystyrene melting at 232° C. were obtained. 0.1 gram of amorphous polystyrene could be isolated from the mother liquor.

We claim:

1. A process for the manufacture of titanium trichloride/aluminum chloride mixed crystals from gaseous titanium trichloride and gaseous aluminum chloride comprising separately and continuously producing a gaseous mixture consisting essentially of titanium trichloride and aluminum chloride, supplying continuously said titanium trichloride and said aluminum chloride in a molar ratio of about 5:1 to 2:1 to a mixing zone, mixing therein said gases rapidly and intimately, immediately and continuously chilling the reaction products obtained in said mixing zone by discharging them from said mixing zone onto a cool surface, continuously collecting the chilled reaction products and recovering said titanium trichloride/aluminum chloride mixed crystals therefrom.

2. A process as claimed in claim 1, wherein the walls of said mixing zone are cooled to a temperature below about 300° C.

3. A process as claimed in claim 1, wherein the titanium chloride and the aluminum chloride are used in a molar ratio of about 3:1.

4. A process as claimed in claim 1, wherein the starting material is titanium trichloride prepared by reducing titanium tetrachloride with hydrogen.

5. A process as claimed in claim 4, wherein said hydrogen is preheated in an electric arc at temperatures of at least 2000° C. and introduced at a great velocity into a mixing zone the walls of which are cooled, said mixing zone being also fed with titanium tetrachloride and aluminum chloride which have previously been transformed in separate vaporization zones into the gaseous phase, said hydrogen is rapidly and intimately mixed in the said mixing zone with said titanium tetrachloride and aluminum chloride whereby the titanium tetrachloride is reduced by the hydrogen to titanium trichloride and the gas mixture is chilled immediately after the formation of said titanium chloride and discharged onto a cool surface from which said mixed crystals are removed and recovered.

6. A process as claimed in claim 5, wherein aluminum chloride in vapor form is admixed with the gaseous titanium tetrachloride before said titanium tetrachloride is mixed and reduced with the preheated hydrogen to titanium trichloride.

7. A process as claimed in claim 1, wherein said gaseous mixture of titanium trichloride and aluminum chloride additionally contains a carrier gas.

8. A process as set forth in claim 1, wherein said gaseous aluminum chloride is produced by vaporizing aluminum chloride.

References Cited by the Examiner

UNITED STATES PATENTS

| | | |
|---|---|---|
| 296,765 | 4/1884 | Martin. |
| 1,343,833 | 6/1920 | Leitch. |
| 3,010,787 | 11/1961 | Tornquist _____ 252—442 |
| 3,032,390 | 5/1962 | Caunt _____ 23—51 |
| 3,063,798 | 11/1962 | Langer et al._____ 23—87 |
| 3,118,729 | 1/1964 | Kummer _____ 252—441 X |
| 3,121,063 | 2/1964 | Tornquist _____ 23—87 X |
| 3,152,090 | 10/1964 | Cobel et al. _____ 252—442 |
| 3,172,865 | 3/1965 | Fennell _____ 252—441 X |

OSCAR R. VERTIZ, *Primary Examiner.*

EDWARD STERN, *Examiner.*